US011072256B2

(12) United States Patent
Butler et al.

(10) Patent No.: US 11,072,256 B2
(45) Date of Patent: Jul. 27, 2021

(54) BATTERY CHARGER STATUS CONTROL SYSTEM AND METHOD

(71) Applicant: Schumacher Electric Corp., Mount Prospect, IL (US)

(72) Inventors: Brian F. Butler, Chicago, IL (US); Linh Nguyen, Elk Grove Village, IL (US); Patrick Clarke, St. Charles, IL (US); John Whiting, Hampshire, IL (US)

(73) Assignee: Schumacher Electric Corporation, Mt. Prospect, IL (US)

( * ) Notice: Subject to any disclaimer, the term of this patent is extended or adjusted under 35 U.S.C. 154(b) by 0 days.

(21) Appl. No.: 15/355,949

(22) Filed: Nov. 18, 2016

(65) Prior Publication Data

US 2017/0066342 A1    Mar. 9, 2017

Related U.S. Application Data

(63) Continuation of application No. 14/826,747, filed on Aug. 14, 2015, now Pat. No. 9,579,990.

(Continued)

(51) Int. Cl.
*H02J 7/00* (2006.01)
*B60L 53/60* (2019.01)
(Continued)

(52) U.S. Cl.
CPC ............. *B60L 53/60* (2019.02); *B60L 53/22* (2019.02); *B60L 53/305* (2019.02); *B60L 53/68* (2019.02);

(Continued)

(58) Field of Classification Search
CPC .. Y02T 90/14; Y02T 10/7011; Y02T 10/7016; Y02T 10/7088; Y02T 90/127;
(Continued)

(56) References Cited

U.S. PATENT DOCUMENTS 3,343,057 A    9/1967    Smith
3,590,357 A    6/1971    Reid
(Continued)

FOREIGN PATENT DOCUMENTS

EP    2712757    4/2014
WO    WO2014142759    9/2014

OTHER PUBLICATIONS

"Jump-N-Carry® Models 300, 400, 660, 950, 4000 & 12/24" Specification Sheet.
(Continued)

*Primary Examiner* — Richard Isla
*Assistant Examiner* — Johali A Torres Ruiz
(74) *Attorney, Agent, or Firm* — Michael Stanley Tomsa; McAndrews, Held & Malloy, Ltd.

(57) ABSTRACT

A battery charging system comprising a battery charger configured to deliver power to a rechargeable battery, wherein the battery charger comprises a wireless data transceiver; and a remote server communicatively coupled to the battery charger through a network via said wireless data transceiver and configured to communicate one or more battery charge parameters or battery charger control commands between the battery charger and a remotely situated portable user device.

27 Claims, 8 Drawing Sheets

Related U.S. Application Data

(60) Provisional application No. 62/037,380, filed on Aug. 14, 2014.

(51) Int. Cl.
| | |
|---|---|
| *F02N 11/14* | (2006.01) |
| *F02N 11/12* | (2006.01) |
| *B60L 53/68* | (2019.01) |
| *B60L 53/22* | (2019.01) |
| *B60L 53/30* | (2019.01) |
| *G06Q 50/00* | (2012.01) |
| *H02J 1/10* | (2006.01) |

(52) U.S. Cl.
CPC .............. *F02N 11/12* (2013.01); *F02N 11/14* (2013.01); *G06Q 50/00* (2013.01); *H02J 7/0021* (2013.01); *H02J 7/00036* (2020.01); *H02J 7/0047* (2013.01); *H02J 7/0071* (2020.01); *B60L 2250/10* (2013.01); *B60L 2250/16* (2013.01); *F02N 2300/306* (2013.01); *H02J 1/122* (2020.01); *Y02T 10/70* (2013.01); *Y02T 10/7072* (2013.01); *Y02T 90/12* (2013.01); *Y02T 90/14* (2013.01); *Y02T 90/16* (2013.01)

(58) Field of Classification Search
CPC ..... Y02T 90/128; Y02T 90/16; Y02T 90/163; B60L 53/60; B60L 53/68; B60L 53/22; B60L 53/305; B60L 2250/10; H02J 7/0021; H02J 7/0047; H02J 1/122; G05Q 50/00
USPC .................................................. 320/104, 109
See application file for complete search history.

(56) References Cited

U.S. PATENT DOCUMENTS

| | | | |
|---|---|---|---|
| 3,950,688 A | 4/1976 | Sancey et al. | |
| 4,079,304 A | 3/1978 | Brandenburg | |
| 4,829,223 A | 5/1989 | Broberg et al. | |
| 5,793,185 A | 8/1998 | Prelec et al. | |
| 5,796,255 A | 8/1998 | McGowan | |
| 5,814,972 A | 9/1998 | Shimada et al. | |
| 6,020,719 A | 2/2000 | Nishigaki et al. | |
| 6,130,519 A | 10/2000 | Whiting et al. | |
| 6,155,870 A | 12/2000 | Valentine | |
| 6,344,733 B1 | 2/2002 | Crass et al. | |
| 6,356,050 B1 | 3/2002 | Hussaini | |
| 6,377,029 B1 | 4/2002 | Krieger et al. | |
| 6,380,712 B2 | 4/2002 | Murphy et al. | |
| 6,424,158 B2 | 7/2002 | Klang | |
| 6,466,025 B1 | 10/2002 | Klang | |
| 6,679,212 B2 | 1/2004 | Kelling | |
| 6,756,764 B2 | 6/2004 | Smith et al. | |
| 6,788,025 B2 | 9/2004 | Bertness et al. | |
| 6,799,993 B2 | 10/2004 | Krieger et al. | |
| 6,819,010 B2 | 11/2004 | Burke | |
| 6,871,151 B2 | 3/2005 | Bertness | |
| 6,871,625 B1 | 3/2005 | Burke | |
| 6,943,666 B2 | 9/2005 | Mooney et al. | |
| 6,988,475 B2 | 1/2006 | Burke | |
| 7,003,411 B2 | 2/2006 | Bertness | |
| 7,015,674 B2 | 3/2006 | VonderHaar | |
| 7,161,253 B2 | 1/2007 | Sodeman | |
| 7,161,476 B2 | 1/2007 | Hardman et al. | |
| 7,301,303 B1 | 11/2007 | Hulden | |
| 7,345,450 B2 | 3/2008 | Krieger et al. | |
| 7,408,358 B2 | 8/2008 | Knopf | |
| 7,498,767 B2 | 3/2009 | Brown et al. | |
| 7,501,795 B2 | 3/2009 | Bertness et al. | |
| 7,528,579 B2 | 5/2009 | Pacholok et al. | |
| 7,598,743 B2 | 10/2009 | Bertness | |
| 7,656,118 B2 | 2/2010 | Krieger et al. | |
| 7,772,850 B2 | 8/2010 | Bertness | |
| 7,774,151 B2 | 8/2010 | Bertness | |
| 7,808,211 B2 | 10/2010 | Pacholok et al. | |
| 7,808,375 B2 | 10/2010 | Bertness et al. | |
| 7,834,593 B2 | 11/2010 | Johnson et al. | |
| 7,915,856 B2 | 3/2011 | Krampitz et al. | |
| 7,924,015 B2 | 4/2011 | Bertness | |
| 8,013,567 B2 | 9/2011 | Windsor | |
| 8,120,364 B2 | 2/2012 | Elder et al. | |
| 8,179,103 B2 | 5/2012 | Doljack | |
| 8,237,412 B2 | 8/2012 | Johnson et al. | |
| 8,386,199 B2 | 2/2013 | Goff et al. | |
| 8,437,908 B2 | 5/2013 | Goff et al. | |
| 8,513,949 B2 | 8/2013 | Bertness | |
| 8,558,690 B2 | 10/2013 | Kleve et al. | |
| 8,575,899 B2 | 11/2013 | Whiting et al. | |
| 8,576,061 B2 | 11/2013 | Miller et al. | |
| 8,610,396 B2 | 12/2013 | Hunter et al. | |
| 8,664,912 B2 | 3/2014 | Olsberg | |
| 8,664,915 B2 | 3/2014 | Sutardja | |
| 8,674,654 B2 | 3/2014 | Bertness | |
| 8,854,013 B2 | 10/2014 | Gao et al. | |
| 8,872,516 B2 | 10/2014 | Bertness | |
| 8,947,054 B2 | 2/2015 | Johnson et al. | |
| 8,958,998 B2 | 2/2015 | Bertness | |
| 9,007,015 B1 | 4/2015 | Nook et al. | |
| 9,013,323 B2 | 4/2015 | Grothaus et al. | |
| 9,018,958 B2 | 4/2015 | Bertness | |
| 9,060,213 B2 | 6/2015 | Jones | |
| 9,216,659 B2 | 12/2015 | Seo et al. | |
| 9,260,067 B2 | 2/2016 | Kai | |
| 9,263,907 B2 | 2/2016 | Richardson et al. | |
| 9,371,067 B2 | 6/2016 | Dao et al. | |
| 9,506,446 B2 | 11/2016 | Xinfang | |
| 9,525,297 B2 | 12/2016 | Wang | |
| 9,553,460 B2 | 1/2017 | Dao et al. | |
| 9,581,654 B2 | 2/2017 | Campbell et al. | |
| 2001/0038276 A1 | 11/2001 | Resch et al. | |
| 2002/0008523 A1 | 1/2002 | Klang | |
| 2002/0041174 A1 | 4/2002 | Prelec et al. | |
| 2002/0145404 A1 | 10/2002 | Dasgupta et al. | |
| 2002/0167296 A1 | 11/2002 | Nagata et al. | |
| 2003/0052645 A1 | 3/2003 | Sasaki | |
| 2003/0137277 A1 | 7/2003 | Ichiro | |
| 2003/0141845 A1* | 7/2003 | Krieger | H02J 7/342 320/132 |
| 2004/0054503 A1* | 3/2004 | Namaky | G01R 31/007 702/183 |
| 2004/0130298 A1 | 7/2004 | Krieger et al. | |
| 2004/0239290 A1 | 12/2004 | Krieger | |
| 2005/0258797 A1 | 11/2005 | Hung | |
| 2005/0285445 A1* | 12/2005 | Wruck | H02J 9/002 307/10.1 |
| 2006/0133007 A1 | 6/2006 | Shiue et al. | |
| 2006/0244412 A1 | 11/2006 | Bonzer et al. | |
| 2007/0063675 A1* | 3/2007 | Walline | H01M 10/488 320/132 |
| 2007/0278990 A1* | 12/2007 | Raichle | H02J 7/022 320/104 |
| 2007/0285049 A1 | 12/2007 | Krieger et al. | |
| 2008/0061733 A1 | 3/2008 | Toya | |
| 2008/0246443 A1 | 10/2008 | Doljack | |
| 2008/0275737 A1 | 11/2008 | Gentry et al. | |
| 2009/0171600 A1 | 7/2009 | Machiyama | |
| 2009/0174362 A1 | 7/2009 | Richardson et al. | |
| 2009/0218988 A1 | 9/2009 | Richardson et al. | |
| 2009/0246596 A1* | 10/2009 | Sridhar | H01M 10/635 429/513 |
| 2010/0039065 A1 | 2/2010 | Kinkade, Jr. | |
| 2010/0072946 A1* | 3/2010 | Sugano | H01M 10/486 320/108 |
| 2010/0117591 A1 | 5/2010 | Thomas et al. | |
| 2010/0241377 A1 | 9/2010 | Kagawa | |
| 2010/0301800 A1 | 12/2010 | Inskeep | |
| 2010/0315046 A1 | 12/2010 | Trainor et al. | |
| 2011/0029157 A1 | 2/2011 | Muzaffer | |

(56) References Cited

U.S. PATENT DOCUMENTS

| | | | |
|---|---|---|---|
| 2011/0046831 A1* | 2/2011 | Ananthakrishna | B60K 6/12 |
| | | | 701/22 |
| 2011/0074350 A1* | 3/2011 | Kocher | B60L 53/53 |
| | | | 320/109 |
| 2011/0100735 A1 | 5/2011 | Flett | |
| 2011/0130905 A1* | 6/2011 | Mayer | G07C 5/008 |
| | | | 701/22 |
| 2011/0258112 A1* | 10/2011 | Eder | B60L 3/12 |
| | | | 705/39 |
| 2012/0068662 A1 | 3/2012 | Durando | |
| 2012/0105010 A1 | 5/2012 | Kinoshita | |
| 2012/0140752 A1* | 6/2012 | Yun | B60L 53/65 |
| | | | 370/338 |
| 2012/0235473 A1 | 9/2012 | Jiang et al. | |
| 2012/0309315 A1* | 12/2012 | Sakata | H04M 1/6091 |
| | | | 455/41.2 |
| 2013/0002049 A1 | 1/2013 | Stampfli | |
| 2013/0020993 A1* | 1/2013 | Taddeo | H02J 7/0027 |
| | | | 320/109 |
| 2013/0086409 A1 | 4/2013 | Lu et al. | |
| 2013/0099738 A1 | 4/2013 | Brockman et al. | |
| 2013/0241498 A1 | 9/2013 | Koebler | |
| 2013/0264875 A1 | 10/2013 | Kaminsky et al. | |
| 2013/0310112 A1* | 11/2013 | You | H04W 52/0267 |
| | | | 455/566 |
| 2014/0013128 A1 | 1/2014 | Wong | |
| 2014/0084844 A1 | 3/2014 | Weflen | |
| 2014/0088827 A1 | 3/2014 | Yashiro | |
| 2014/0107864 A1 | 4/2014 | Cecchini | |
| 2014/0139175 A1 | 5/2014 | Gonzalez | |
| 2014/0159509 A1 | 6/2014 | Inskeep | |
| 2014/0253017 A1 | 9/2014 | Kominami et al. | |
| 2014/0300310 A1 | 10/2014 | Caren | |
| 2014/0300311 A1 | 10/2014 | Caren et al. | |
| 2015/0102781 A1 | 4/2015 | Inskeep | |
| 2015/0130400 A1 | 5/2015 | Inskeep | |
| 2015/0168499 A1 | 6/2015 | Palmisano | |
| 2015/0372531 A1 | 12/2015 | Tanabe | |
| 2016/0072323 A1 | 3/2016 | Miller et al. | |
| 2016/0072329 A1 | 3/2016 | Miller et al. | |
| 2016/0181587 A1 | 6/2016 | Koebler et al. | |
| 2016/0226266 A1 | 8/2016 | Huang | |
| 2016/0238667 A1 | 8/2016 | Palmisano et al. | |
| 2016/0268645 A1 | 9/2016 | Koebler | |

OTHER PUBLICATIONS

"Cunningham, Wayne, Three pocket-size jump starters, http://www.cnet.com/news/pocket-sized-jump-starters/, Apr. 28, 2014".
International Search Report and Written Opinion, dated Nov. 30, 2015, in International application No. PCT/US2015/045323, filed Aug. 14, 2015.
International Preliminary Report on Patentability, dated Feb. 14, 2017, in International application No. PCT/US2015/045323, filed Aug. 14, 2015.
Supplemental European Search Report for Application No. EP 15 83 2596, dated Feb. 1, 2018.
Supplemental European Search Report for Application No. EP 15 83 1498, dated Mar. 15, 2018.
Communication in European Application No. EP 15 83 2596.9, dated Feb. 5, 2019.
Communication in European Application No. EP 15 831 498.9, dated Apr. 18, 2019.
Schumacher Electric: "XC103W 100 Amp Battery Charger with Engine Start from Schumacher," Aug. 11, 2014 (Aug. 11, 2014), pp. 1-2, XP054979296, Retrieved from the Internet: URL:https://www.youtube.com/watch?v=dZ6YduxgsMA&feature=youtu.be&t=51 [retrieved on Apr. 11, 2019].
Examination report No. 1 for standard patent application in Australian Application No. 2018241089, dated Nov. 25, 2019.

* cited by examiner

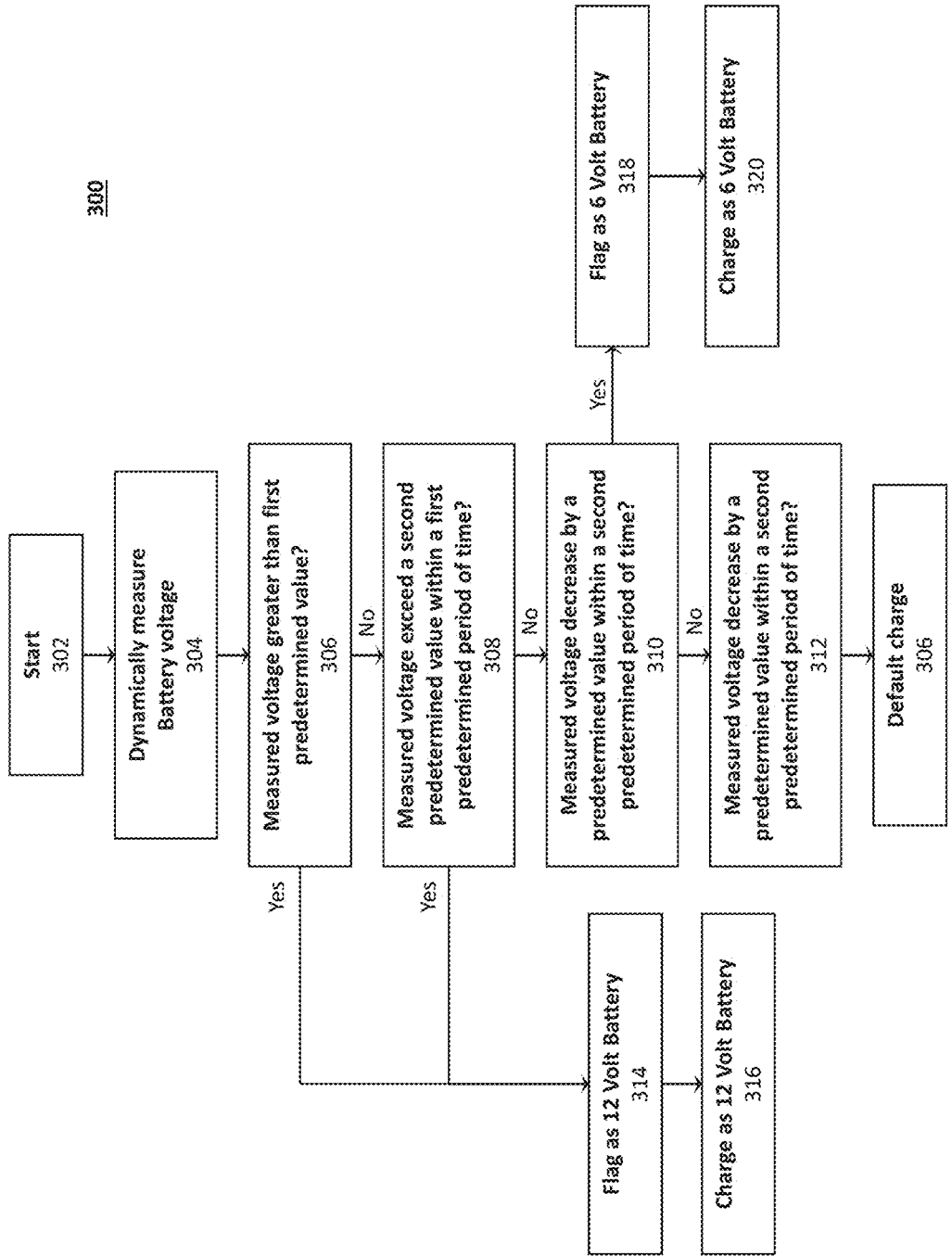

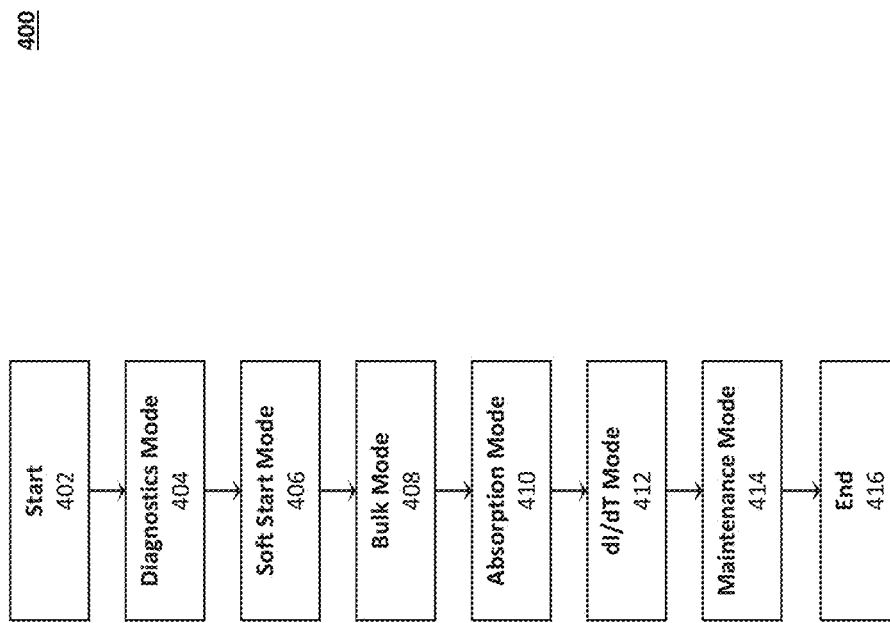

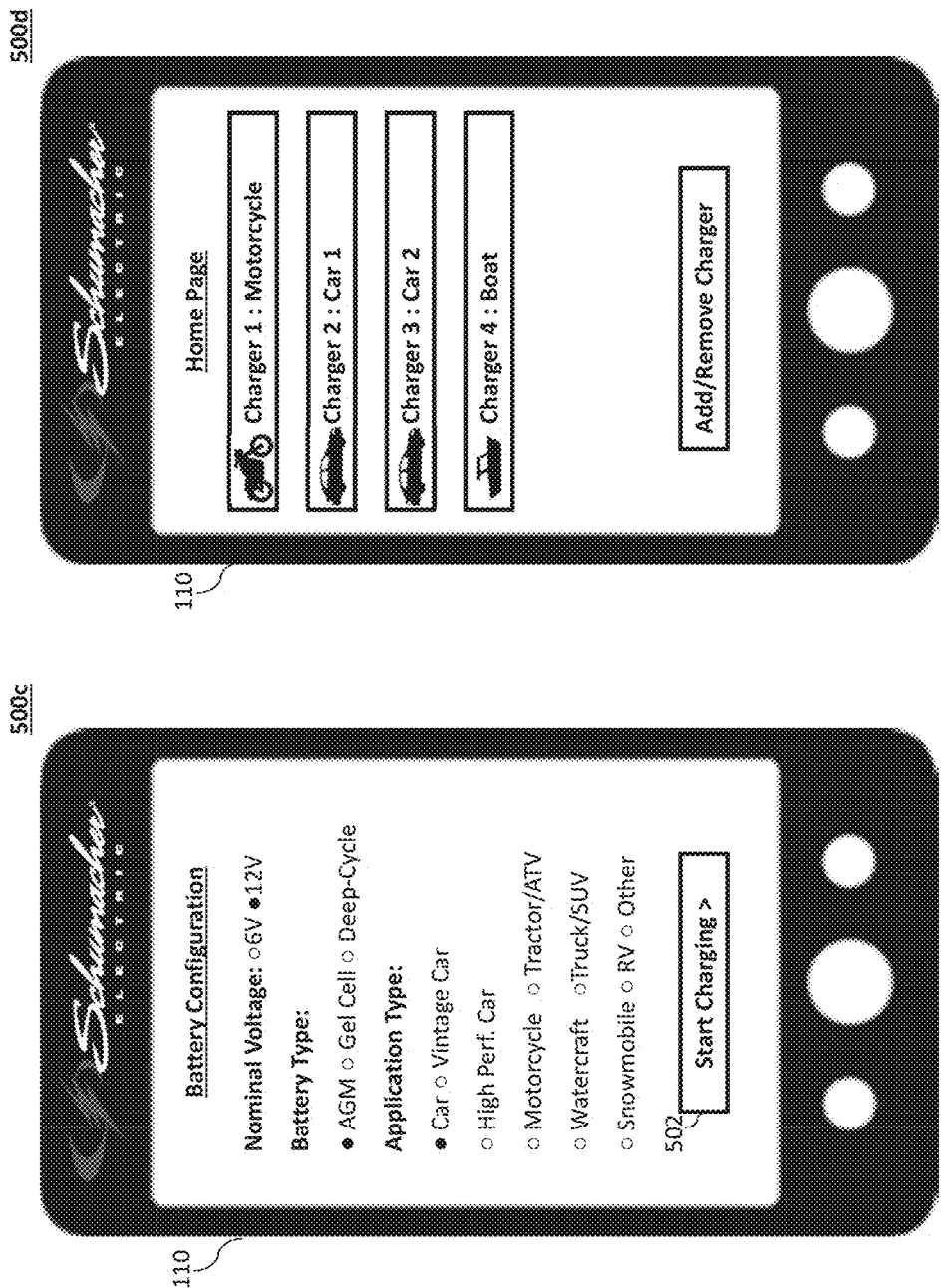

BATTERY CHARGER STATUS CONTROL SYSTEM AND METHOD

CROSS REFERENCE TO RELATED APPLICATIONS

This application is a continuation of and claims priority to U.S. application Ser. No. 14/826,747, filed on Aug. 14, 2015, entitled "Battery Charger Status Control System and Method," which claims priority to U.S. Provisional Patent Application No. 62/037,380, filed on Aug. 14, 2014 and entitled "Battery Charger Status Control System and Method." Each application is hereby incorporated by reference in its entirety.

TECHNICAL FIELD

The present invention relates to battery chargers and battery charger systems. More specifically, the present invention relates to systems, methods, and apparatuses for remotely monitoring or controlling a battery booster or charger.

BACKGROUND

Various types of battery chargers are known in the art. Generally, an automobile battery charger converts a 120-volt (V), 60-Hz AC-line, to a 12-volt DC output through a power transformer, a bridge rectifier, and a filter. The power transformer generally comprises two separate windings that are magnetically coupled to each other. The first winding is connected to the 120V AC-line and the second winding is connected to the bridge rectifier. Through the selection of an appropriate turn ratio, the AC-line voltage is stepped down to a 12-volt AC-line output. The bridge rectifier converts this stepped down AC-line output to a rectified output. Further, eliminating any time-varying magnitudes of the rectified output through a filter, the output of the battery charger may be stabilized and thereby suitable for charging a battery.

For example, commonly owned U.S. Pat. No. 7,528,579 discloses a high frequency battery charger that includes a converter, drive logic, and control logic, while U.S. Pat. No. 8,237,412 discloses a method of charging a battery whereby the charging current is alternated between non-zero DC charging current levels. As battery chargers increase in sophistication, additional features have been implemented. For example, commonly owned U.S. Pat. No. 8,576,899 discloses a voltage detection system that automatically determines the nominal voltage (e.g., 6 volt or 12 volt) of the battery connected to its battery charger terminals and charges the battery as a function of the detected nominal voltage irrespective of the nominal voltage selected by a user. Further, commonly owned U.S. Pat. No. 8,576,899 discloses a hybrid battery charger that includes a linear battery charging circuit for providing vehicle starting current and battery charging and a high frequency battery charging circuit that provides battery charging current. Battery chargers may, in addition to charging a battery, provide protective and safety features. For example, commonly owned U.S. Pat. No. 7,834,593 discloses a protection system and method for detecting a thermal runaway condition in a battery during charging in order to protect the battery when such a thermal runaway condition has been detected.

Such battery charger may further provide a display to output the status of the battery or the battery charge. However, because the battery charger must typically be coupled to the battery that is being charged, such as coupling a vehicle to a battery charger in a garage, the user cannot remotely monitor or control the battery charger. Thus, despite the prior attempts to improve battery chargers, a need exists for a system, method, and apparatus for remotely monitoring or controlling a battery charger.

SUMMARY OF THE INVENTION

The present disclosure is directed to a system, method, and apparatus for remotely monitoring or controlling a battery charger.

According to a first aspect of the present invention, a battery system comprises: a battery charger configured to charge a battery in a vehicle, wherein the battery charger comprises a wireless data transceiver; and a remote server communicatively coupled with the battery charger over a communication network via said wireless data transceiver, wherein the remote server communicates one or more parameters of the battery charger or the battery from said battery charger to a remotely situated, portable user device.

According to a second aspect of the present invention, a battery charger comprises: a charger circuit for selectively charging a battery using one or more charging modes; a set of output terminals connected to said charger circuit and configured to couple with the battery; a sensor, the sensors detecting one or more parameters of the battery charger or the battery; a wireless data transceiver; and a processor operatively couple with each of said charger circuit, said voltage sensor, and said wireless data transceiver, wherein said battery charger is communicatively coupled with a remote server over a communication network via said wireless data transceiver, wherein said battery charger transmits said one or more parameters said battery charger to a remotely situated, portable user device.

According to a third aspect of the present invention, a battery charger management system comprises: processing circuitry; and a communication interface communicatively coupled with one or more remotely situated battery chargers and one or more remotely situated, portable user devices over a communication network, wherein said one or more remotely situated battery chargers are configured to charge a battery in a vehicle, wherein the communication interface receives one or more parameters of said one or more remotely situated battery chargers or the battery from said battery charger, wherein the communication interface communicates said one or more parameters of said one or more remotely situated battery chargers to said remotely situated, portable user device.

In certain aspects, the portable user device is a mobile phone.

In certain aspects, the remote server communicates a control command from said remotely situated, portable user device to said battery charger.

In certain aspects, the control command instructs the battery charger to perform at least one of: (1) charge the battery; (2) stop charging the battery; and (3) reset the battery charger.

In certain aspects, the control command instructs the battery charger to jump start the vehicle.

In certain aspects, the battery charger comprises a Global Positioning System (GPS) transmitter. The GPS transmitter may generate positional data, said positional data being communicated from said battery charger to said remotely situated, portable user device.

In certain aspects, the battery charger employs a predetermined charging mode based at least in part on a user input at said remotely situated, portable user device.

In certain aspects, the user input indicates a battery type or the battery's nominal voltage.

In certain aspects, the battery charger is integrated with a vehicle.

In certain aspects, the communication interface (1) receives a control command from one of said one or more remotely situated, portable user devices and (2) instructs one of said one or more remotely situated battery chargers to perform at least one of (i) charge the battery, (ii) stop charging the battery, (iii) reset the battery charger, and/or (iv) jump start the vehicle.

DESCRIPTION OF THE DRAWINGS

These and other advantages of the present invention will be readily understood with reference to the following specifications and attached drawings wherein:

FIG. 3 illustrates an example auto-detection algorithm.

FIG. 4 illustrates a flow diagram depicting an example battery charging protocol.

FIG. 5c illustrates an exemplary interface device battery configuration page.

FIG. 5d illustrates an exemplary interface device home page.

DETAILED DESCRIPTION

Figure 1A:
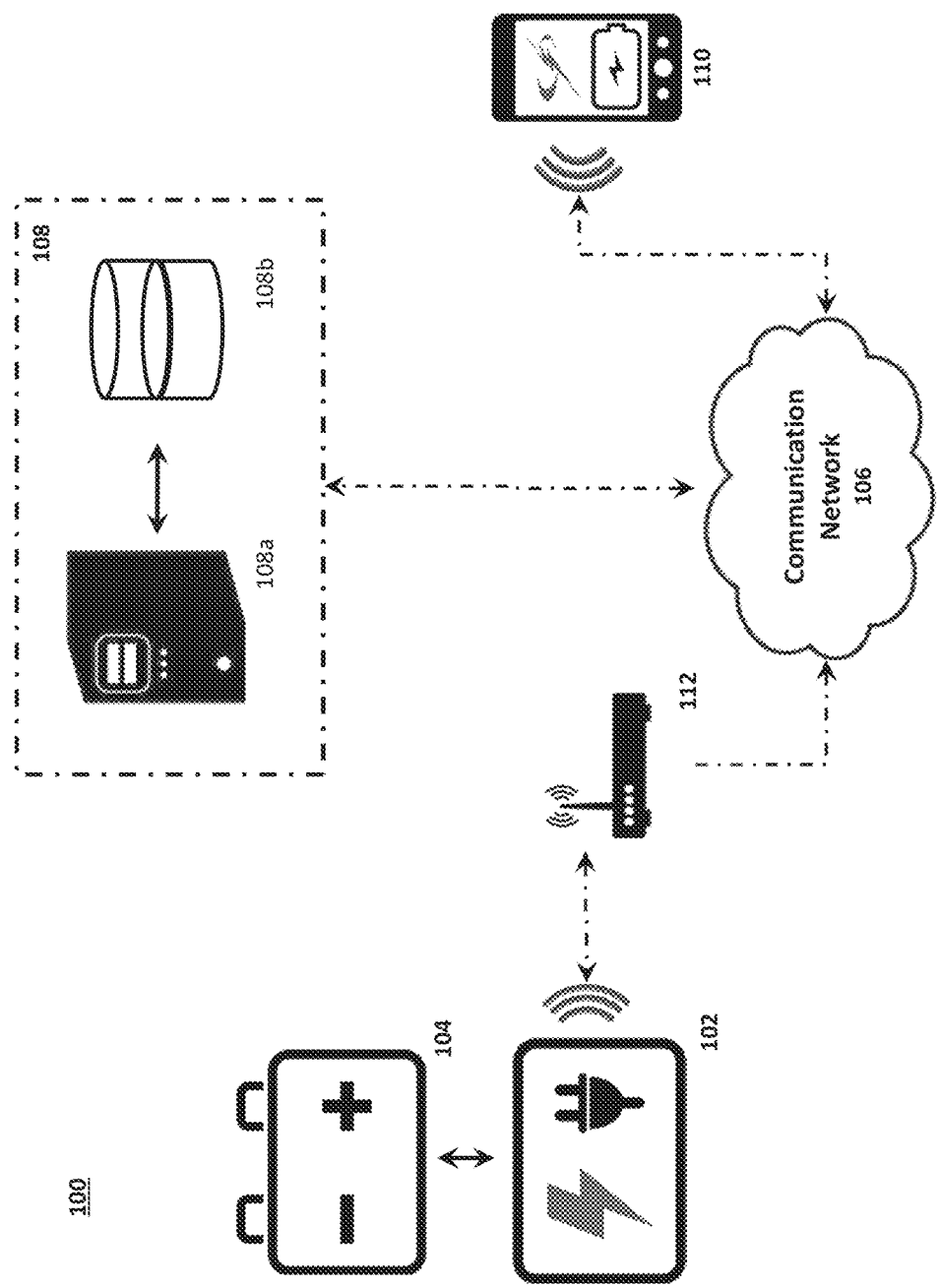
FIG. 1a illustrates an exemplary battery charging system and network configured to facilitate monitoring and controlling a remote battery.

Preferred embodiments of the present invention will be described hereinbelow with reference to the accompanying drawings. In the following description, well-known functions or constructions are not described in detail because they may obscure the invention in unnecessary detail. The present invention relates to a system, method, and apparatus for remotely monitoring or controlling a battery or a battery charger. For this disclosure, the following terms and definitions shall apply:

As used herein, the word "exemplary" means "serving as an example, instance, or illustration." The embodiments described herein are not limiting, but rather are exemplary only. It should be understood that the described embodiments are not necessarily to be construed as preferred or advantageous over other embodiments. Moreover, the terms "embodiments of the invention," "embodiments," or "invention" do not require that all embodiments of the invention include the discussed feature, advantage, or mode of operation.

The terms "communicate" and "communicating" as used herein, include both conveying data from a source to a destination and delivering data to a communications medium, system, channel, network, device, wire, cable, fiber, circuit, and/or link to be conveyed to a destination. The term "communication" as used herein means data so conveyed or delivered. The term "communications" as used herein includes one or more of a communications medium, system, channel, network, device, wire, cable, fiber, circuit, and/or link.

The terms "coupled," "coupled to," and "coupled with" as used herein, each mean a relationship between or among two or more devices, apparatuses, files, circuits, elements, functions, operations, processes, programs, media, components, networks, systems, subsystems, and/or means, constituting any one or more of: (i) a connection, whether direct or through one or more other devices, apparatuses, files, circuits, elements, functions, operations, processes, programs, media, components, networks, systems, subsystems, or means; (ii) a communications relationship, whether direct or through one or more other devices, apparatuses, files, circuits, elements, functions, operations, processes, programs, media, components, networks, systems, subsystems, or means; and/or (iii) a functional relationship in which the operation of any one or more devices, apparatuses, files, circuits, elements, functions, operations, processes, programs, media, components, networks, systems, subsystems, or means depends, in whole or in part, on the operation of any one or more others thereof.

The term "data" as used herein means any indicia, signals, marks, symbols, domains, symbol sets, representations, and any other physical form or forms representing information, whether permanent or temporary, whether visible, audible, acoustic, electric, magnetic, electromagnetic, or otherwise manifested. The term "data" is used to represent predetermined information in one physical form, encompassing any and all representations of corresponding information in a different physical form or forms.

The term "database" as used herein means an organized body of related data, regardless of the manner in which the data or the organized body thereof is represented. For example, the organized body of related data may be in the form of one or more of a table, map, grid, packet, datagram, frame, file, email, message, document, report, list, or in any other form.

The term "network" as used herein includes both networks and inter-networks of all kinds, including the Internet, and is not limited to any particular network or inter-network.

The term "processor" as used herein means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing.

FIG. 1a illustrates a battery charging system and network configured to facilitate monitoring and controlling of a remote battery (e.g., battery 104) and/or remote battery charger (e.g., smart battery chargers 102). As illustrated, the battery charging system 100 may comprise a communication network 106 (e.g., the Internet) that is communicatively coupled, via one or more data transmission devices, with, for example, a battery management server 108, one or more smart battery chargers 102, and one or more interface devices 110. In certain aspects, the battery management server 108 may be configured to receive data and, therefore, may be communicatively coupled with one or more non-transitory data storage devices 108*b*.

The one or more smart battery chargers 102 and/or associated functionality may be removably coupled with a vehicle (e.g., via the vehicle's starting battery), or integral with the vehicle. For example, a smart battery charger 102, or other battery monitoring system, may be removably coupled to a vehicle via a pair of battery clamps 152. Conversely, the smart battery charger 102 may be fixedly attached or integral with the vehicle (e.g., via a bolt and ring terminals), or as part of the vehicle's factory electrical system. Accordingly, a system in accordance with an aspect of the present disclosure may be provided in an aftermarket form configured for use with existing vehicles, or integral with a vehicle as an original equipment manufacturer (OEM) component or feature. In lieu of clamps 152, charger cables may be fixedly coupled to the battery 104 and configured to quick connect to smart battery chargers 102 (e.g., using quick connects/disconnect connectors). In certain instances, the quick connect connectors may not be compatible with different devices. For example, a battery maintainer (a/k/a trickle charger) may use a first type of connector, while a battery booster may use a second type of connector. Such issues are common between different manufacturers. Due to the inconvenience of disconnecting and reconnecting the fixedly coupled connections, it may be advantageous to use a charger cable that fixedly couples to the battery 104 at one end, but provides a plurality of different connectors at the second end. For example, the first end may be fixedly coupled to a battery 104 battery terminal through the ring terminals, while the second end may be provided with two connecters, namely (1) an EC5 (male) connector configured to couple with an EC5 (female) connector of the battery booster and (2) a second (male) connector configured to couple with a second (female) connector of a battery charger/maintainer (e.g., smart battery charger 102). One or more end caps may be further provided to protect the unused connector from dirt and debris. Such a charger cable would be of particular use for vehicles that are not often used and typically require jump starting. While two connectors are described, such a charger cable need not be limited to two connectors, nor should it be limited to the example connector types described.

The battery management server 108 may be cloud hosted and communicatively coupled with the one or more interface devices 110 and/or one or more smart battery chargers 102 using, for example, a surface-mount module that enables a Platform-as-a-Service (PaaS) for connected products. Communication may be facilitated using, for example, an Arrayent Connect Module ("ACM") and Arrayent Connect 900/868 Serial Protocol. The Arrayent Connect 900/868 Serial Protocol employs 5 types of messages, each message type having 5 fields. Baud rate for communication is adjustable from 2400 to 115200, the default being 38400. The message types and fields are: (1) SYNC—one byte long and always 0xD9; (2) TYPE—specifies the type of message, which may include Response, Connection Status, Time Data, Single Attribute Message, Multi-Attribute Message; (3) LEN—the length in bytes of the DATA and CSUM fields, the DATA field is variable and the CSUM is 1 byte; (4) DATA—the payload of the message, the maximum length is 100 bytes; and (5) CSUM—the negative sum of all previous bytes except SYNC. The Response message may be used as acknowledgement of received messages. The Connection Status message represents the connection status between the ACM and the cloud. The Time Data message represents the Time information available to microcontroller from cloud. The Single Attribute Message is a message that has only one key-value pair. The Multi-Attribute Message is a message that has multiple key-value pairs.

The one or more non-transitory data storage devices may be used to provide additional data, or to update data, as needed (e.g., periodically, or as a real-time data feed). The data transmission device may be a wireless data device, such as a wireless transceiver, a wired connection, or a combination thereof. For example, the smart battery charger 102 may wirelessly communicate with a wireless transceiver 112 (e.g., Wi-Fi router and/or modem), which, in turn, may be wiredly coupled to a network. Example interface devices 110 include desktop computers and mobile devices, such as smart phones (i.e., mobile phones with more advanced computing capability and connectivity than basic feature phones), tablet computers, laptop computers, etc. The smart battery charger 102 may be a portable battery charger, such as a battery booster (e.g., having a larger internal battery configured to start, or charge, a vehicle or device without being coupled to an AC power source). Such battery boosters are also called jump starters.

While the communication network 106 is illustrated as a single network, one of skill in the art would recognize that one or more communication networks might be used to facilitate communication between the various components of the battery charging system 100. In certain embodiments, the one or more interface devices 110 may be configured to communicate directly with the one or more smart battery chargers 102. Further, the data transmission device may employ an encrypted communication channel, such as Transport Layer Security and Secure Sockets Layer, to communicate data between, for example, one or more smart battery chargers 102, the battery management server 108 and the one or more interface devices 110. Thus, the communication channel may employ one or more encryption methods, such as hashing, symmetric cryptography, and asymmetric cryptography.

The battery management server 108 may be used to facilitate, gather, generate, and/or manage data reflecting one or more parameters of the one or more smart battery chargers 102 and/or battery 104, while also facilitating two-way communication between the one or more interface devices 110 and the one or more smart battery chargers 102. An exemplary battery management server 108 may comprise a processor (e.g., via computer 108*a*) configured to perform one or more algorithms/protocols and a non-transitory data storage device 108*b*. The computer 108*a* may be communicatively and operatively coupled with one or more non-transitory data storage devices 108*b*, which may be a non-transitory, computer-readable medium having one or more databases and/or computer-executable instructions embodied thereon. The computer-executable instructions, when executed by the computer, facilitate various data calculations and protocols employed in facilitating monitoring and/or control of the one or more smart battery chargers 102, and for receiving and/or transmitting data over the communication network 106 and/or with the one or more interface devices 110. The non-transitory data storage device 108*b* may be further configured to store data about one or more users, their batteries (i.e., a battery 104 coupled with the smart battery charger 102). For example, computer 108*a* may be configured to track and/or log the performance, location, and/or history of a particular smart battery charger 102 or battery 104 in the battery charging system 100.

A smart battery charger 102, as disclosed herein, may facilitate both battery charging and maintaining functions for a battery 104, such as a 6V/12V automobile battery, with a float mode to keep the battery 104 fully charged. The smart battery charger 102 may also be configured to start (a/k/a "boost", "jump", or "jump start") an engine coupled to a battery 104 (e.g., a 6V/12V nominal voltage vehicular battery, which may be fully or partially depleted) using a boosting current. Example automobile batteries include, without limitation, lead-acid batteries (e.g., wet/flooded batteries, calcium-calcium batteries; Valve-Regulated, Lead Acid (VRLA) batteries; Gel Cell; and Absorbed Glass Mat (AGM)) and other rechargeable batteries, such as lithium ion batteries. The smart battery charger 102 may be configured to determine, automatically, different battery chemistry—AGM, gel, lithium ion, etc. The smart battery charger 102 may indicate to the user the number of ampere hours put into battery, and/or an indication of state of health of battery. For example, if customer inputs a battery size/model number, the smart battery charger 102 will know the battery capacity and, therefore, may determine and provide the state of health or determine other characteristics of the battery 104.

Figure 1B:
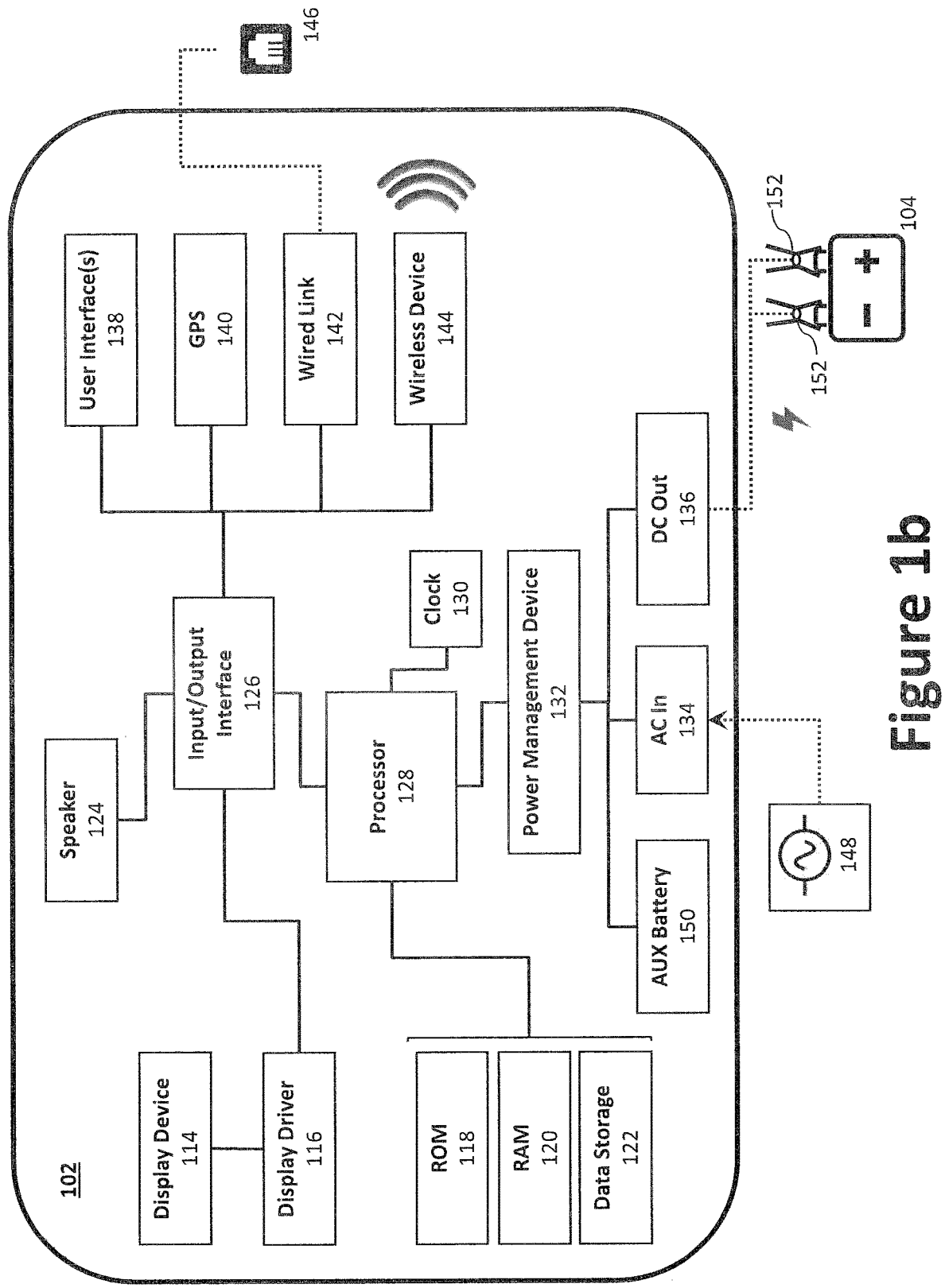
FIG. 1b illustrates an exemplary smart battery charger block diagram configured for use with a battery charging system.

FIG. 1*b* illustrates an example smart battery charger 102 for use with a battery charging system 100. Specifically, FIG. 1*b* illustrates a smart battery charger 102 having a processor 128 (e.g., a Central Processing Unit (CPU)) that is operatively coupled to a Read-Only Memory (ROM) 118 for receiving one or more instruction sets, to a Random Access Memory (RAM) 120 having a plurality of buffers for temporarily storing and retrieving information, and to an internal data storage device 122 (e.g., a hard drive, such a solid state drive or other non-volatile data storage device or other non-volatile data storage device, such as flash memory, including removable memory cards). A clock 130 is also coupled to the processor 128 for providing clock or timing signals or pulses thereto. Those skilled in the art will understand that the smart battery charger 102 includes one or more bus structures for interconnecting its various components. Further, to increase ease of use in mobile applications, the various components of a smart battery charger 102 may be housed in a single housing.

The smart battery charger 102 may further include an input/output interface 126 that interfaces the processor 128 with one or more peripheral and/or communicative devices, such as a user interface(s) 138, a Global Positioning System (GPS) transmitter 140, a wired link 142, a wireless device 144, and a speaker 124, which may be used to signal an alert (e.g., charge complete, error, etc.) or other status information. For example, the smart battery charger 102 may be configured to modify the charge algorithm based on input (via said input/output interface 126) from user, such as battery type, battery size, geographic location of the battery 104/smart battery charger 102, and charge history. That is, as a battery ages, the smart battery charger 102 can charge the battery 104 differently to compensate for the age of the battery 104. In certain aspect, if a wrong setting is entered (e.g., by the user), the smart battery charger 102 may update setting to new setting for the next charge cycle.

As illustrated, the processor 128 may be operatively coupled to a display device 114 via a display driver 116. The display device 114 may comprise one or more light emitting diodes (LEDs), or a liquid crystal display (LCD) screen. The LCD screen may be an alphanumeric segmented LCD display, or a matrix LCD display, such as those used in user devices. In certain embodiments, the LCD screen may further provide touch screen functionality to facilitate a user input device via a thin layer of sensing circuitry present either beneath the visible portion of display device 114's surface, or as part of a thin, clear membrane overlying the display device 114 that is sensitive to the position of a pen or finger on its surface. In operation, the display driver 116 may receive display data from the processor 128 via input/output interface 126 and display that display data via the display device 114. For example, interactive LEDs and/or an easy-to-read digital LCD display may be provided on the housing to provide the user with status information and/or input capability (e.g., via a touch screen). In another example, once an AC supply 148 is connected, a first LED may be illuminated to indicate that the smart battery charger 102 is ready to use. When the AC supply 148 is connected and the smart battery charger 102 is successfully connected with the communication network 106 or wireless transceiver 112, a second LED on the unit may be illuminated. Finally, when the DC out 136 is successfully coupled (e.g., clamped, or otherwise electrically coupled) to a battery 104, a third LED may be illuminated. Rather than employing separate LEDs, a single multi-color LED may be employed that changes color depending on the status of the smart battery charger 102.

The user interface 138 may be used to enable the user to switch the charging mode, the battery type, amperage (e.g., 1A, 10A, 50A, etc.) or another setting. Example user interface(s) 138 devices may include, for example, physical buttons, physical switches, a digitizer (whether a touch pad, or transparent layer overlaying the display device 114), and other input devices. For instance, using the digitizer, a user may control or interact with the smart battery charger 102 by writing, or tapping on the display device 114 using, a pen, stylus, or finger.

The GPS transmitter 140 may be used to track and/or monitor the location of the smart battery charger 102 and to relay the location information in the form of positional data (e.g., geographic coordinate system data or Internet Protocol (IP) address) to the battery management server 108 or another device in battery charging system 100 or via the communication network 106. For example, as noted above, the computer 108*a* may be configured to track the activities, location, and/or charge history of a particular smart battery charger 102 in the battery charging system 100. The positional data may also be locally stored to the smart battery charger 102 (e.g., to internal data storage device 122) or communicated to an interface device 110/battery management server 108 via communication network 106.

The wireless device 144 may be configured to manage communication and/or transmission of signals or data between the processor 128 and another device (e.g., an interface device 110 via communication network 106 or directly with an interface device 110) by way of a wireless transceiver. The wireless device 144 may be a wireless transceiver configured to communicate via one or more wireless standards such as Bluetooth (e.g., short-wavelength, UHF radio waves in the ISM band from 2.4 to 2.485 GHz), NFC, Wi-Fi (e.g., IEEE 802.11 standards), etc. For example, wireless connectivity (e.g., RF 900 MHz or Wi-Fi) may be integrated with the smart battery charger 102 to provide remote monitoring and control the smart battery charger 102 via one or more interface devices 110, such as smart phones and tablets. As will be discussed below with regard to, inter alia, FIGS. 5*a* through 5*f*, the one or more interface devices 110 may provide an articulate and user-friendly interface to facilitate control of one or more smart battery chargers 102. That is, via a communication network 106 and the battery management server 108, a user may monitor live charging status updates, charging conditions, historic data, remotely update software and firmware, and stay connected with the smart battery charger 102 manufacturers' news and updates. In fact, the various features and/or options available via the user interface 138 may be remotely controlled via the one or more interface devices 110. In other words, the user interface 138 may be replicated, or otherwise simulated or represented, on an interface device 110. Accordingly, user inputs may be received at the user interface 138 (e.g., via a graphical user interface, touch screen, button, switch, etc.) and the user input, or other instructions, may communicated to the smart battery charger 102 as control data. The control data, when received by at a smart battery charger 102, instruct the smart battery charger 102 to take a particular action. For example, the control data may instructs one of said one or more remotely situated battery chargers to perform one or more functions, such as charge the battery 104, stop charging the battery 104 (i.e., discontinue the supply of output current to the vehicle battery), reset the smart battery charger 102, boost/jump start the battery 104, employ one or more charging modes, etc.

In certain aspects, an internal cellular modem may be implemented that utilizes standards-based wireless technologies, such as 2G, 3G, 4G, code division multiple access (CDMA), and Global System for Mobile Communications (GSM), to provide wireless data communication over worldwide cellular networks. An advantage of an internal cellular modem is that there is no reliance on a user's local network (e.g., wireless router, modem, etc.), thereby enabling communication between the smart battery charger 102 and communication network 106, even in the event of a total power failure in a user's location. Further, using said wireless device 144, the smart battery charger 102 may be configured to download an entirely new charging algorithm wirelessly. In operation, the smart battery charger 102 may first download the new charging algorithm into a secondary memory (e.g., a flash memory chip) before verifying the data is correct in the secondary memory. Afterwards, replace or upgrade an existing algorithm to the new charging algorithm via the main microprocessor, without requiring user consent. Indeed, it may be advantageous to force (i.e., push) certain updates related to: reliability issues; safety, new battery charging profile, etc.

In certain aspects, a wired link 142 may be provided to manage communication and/or transmission of signals or data between the processor 128 and another device via, for example, a data port (e.g., RS-232, Universal Serial Bus (USB), and/or Ethernet ports) capable of being wiredly coupled with another data port 146 positioned outside the smart battery charger 102 housing. For example, a USB port may be provided on the charger to facilitate the charging of portable devices. The smart battery charger 102 may further comprise a plurality of sensors to provide measurement data descriptive of the surrounding environment. For example, the smart battery charger 102 may include a temperature or humidity sensor, or be configured to monitor other appliances or devices, either directly (e.g., using a sensor) or wirelessly (e.g., using Wi-Fi). For example, the smart battery charger 102 may be configured to charge and monitor, in addition to automotive batteries, one or more user devices (e.g., cell phones, computers, etc.) being charged by said smart battery charger 102. Another temperature sensor may be provided to measure the temperature of a battery being charged (e.g., a Li-ion battery). As will be discussed, the smart battery charger 102 may further include start/stop technology.

A power management device 132 may be used to manage power needed to operate the smart battery charger 102 (and components thereof) and to charge the battery 104. That is, alternative current (AC) power may be drawn from an AC power supply 148, converted to direct current (DC) power, and used to charge battery 104. For instance, the smart battery charger 102 may be removably coupled with an AC power supply 148 located outside the housing (e.g., a wall outlet) via an AC in device 134 and an AC-to-DC converter. The DC power may be output to the battery 104 by way of a DC out device 136 (e.g., battery terminal cables/clamps 152). Thus, power management device 132 and processor 108 may control the charging operation of the battery 104 to provide charging, maintaining, and, in certain embodiments, jump starting functionality. Further, power management device 132 and processor 128 may facilitate reverse hook-up protection, as well as automatic battery voltage detection. While the power management device 132 and processor 128 are illustrated as separate components, one of skill in the art would appreciate that power management functionality (e.g., battery charging, battery maintaining, etc.) may be provided as a single component that combines the functionality of the power management device 132 and processor 128. The smart battery charger 102 may further comprise alternate power sources, such as a solar panel to enable battery maintaining and charging, as well as data monitoring using solar power. For example, solar cells may be used to charge or maintain fleet vehicles, such as car dealership fleets, rental cars fleets, etc.

The DC power may be further used to charge an internal auxiliary battery 150 (e.g., a rechargeable lithium ion battery or lead acid battery for outputting a DC). In operation, when the AC power supply 148 is unavailable (e.g., disconnected or out of service), the smart battery charger 102 may draw the power needed to operate the smart battery charger 102's components from the battery 104 and/or auxiliary battery 150, thereby enabling the user to determine the status of the smart battery charger 102 (and state of charge, or other parameters, of the battery 104) even when AC power supply 148 is unavailable (e.g., when a circuit breaker is blown). To that end, the smart battery charger 102 may report the AC power supply 148 failure (e.g., as an alert) to the one or more interface devices 110 via the communication network 106. The battery charging method or technique can be any of a variety of charging techniques including conventional, fast charging, and the like. The compact battery charger 102 may be further configured to determine, automatically, different battery chemistry (e.g., AGM, gel, lithium ion, etc.) and the battery's nominal voltage. The charging characteristics of a battery charger may be configured to match the battery chemistry of the battery to be charged. For example, lead acid batteries may be charged with constant power, constant current, constant voltage, or combination thereof. Such batteries are known to be charged with both linear as well as switched-mode battery chargers. U.S. Pat. No. 7,808,211, assigned to the same assignee as the assignee of the present invention, discloses an example of a switched-mode battery charger for automotive and marine battery applications. Further, commonly owned U.S. Pat. No. 8,947,054 discloses a battery charger and method utilizing alternating DC charging current, while commonly owned U.S. Pat. No. 8,575,899 discloses a battery charger with automatic voltage detection. A suitable example battery booster/charger is disclosed by commonly owned U.S. patent Ser. No. 14/826,805 by Brian F. Butler et al, filed Aug. 14, 2015 and titled "Compact Multifunctional Battery Booster."

As noted above, via a communication network 106 and the battery management server 108, a user may monitor live charging status updates, charging conditions, and historic data and remotely update software and firmware, and stay connected with the smart battery charger 102 manufacturers' news and updates. The user may further control or adjust the settings of the smart battery charger 102 via the interface device 110. Indeed, the interface device 110 may be configured to receive and display one or more parameters of the smart battery charger 102 and/or a battery 104 coupled thereto. For example, the smart battery charger 102 may measure said one or more parameters and communicate, via the communication network 106 and the battery management server 108, the measured date to the interface device 110 to display charging and connection status updates, charging conditions, and control the smart battery charger 102. The smart battery charger 102 may be configured to report a difference in vehicle load by, for example, constantly monitoring battery voltage to detect a draw on auxiliary voltage. For example, a voltage draw may occur when leaving the headlights on in vehicle—an on board charger would notify the user of the current draw (e.g., an alert to the one or more interface devices 110, such as "lights on", "radio on," etc.). The type of draw (e.g., lights, radio, etc.) may be determined by measuring the degree of current draw (e.g., number of amperes/volts). For example, the smart battery charger 102 may be programmed (e.g., by the user or factory) to recognize a x-ampere or volt draw as a "radio on" condition, while a y-ampere or volt draw as a "headlight on" condition, using, for example, a data look up table. The smart battery charger 102 may be pre-programmed during setup to facilitate multiple charger/vehicle use, where the smart battery charger 102 may indicate to the user when to connect to which vehicle in fleet (e.g., as part of a winterized checklist). The one or more parameters may be measured as set forth herein, using known techniques, and/or as set forth by, among others, the U.S. patents and printed publications described in the background of the invention. The smart battery charger 102 may also alert the user when the voltage of the battery 104 drops below a predetermined voltage.

Figure 2:
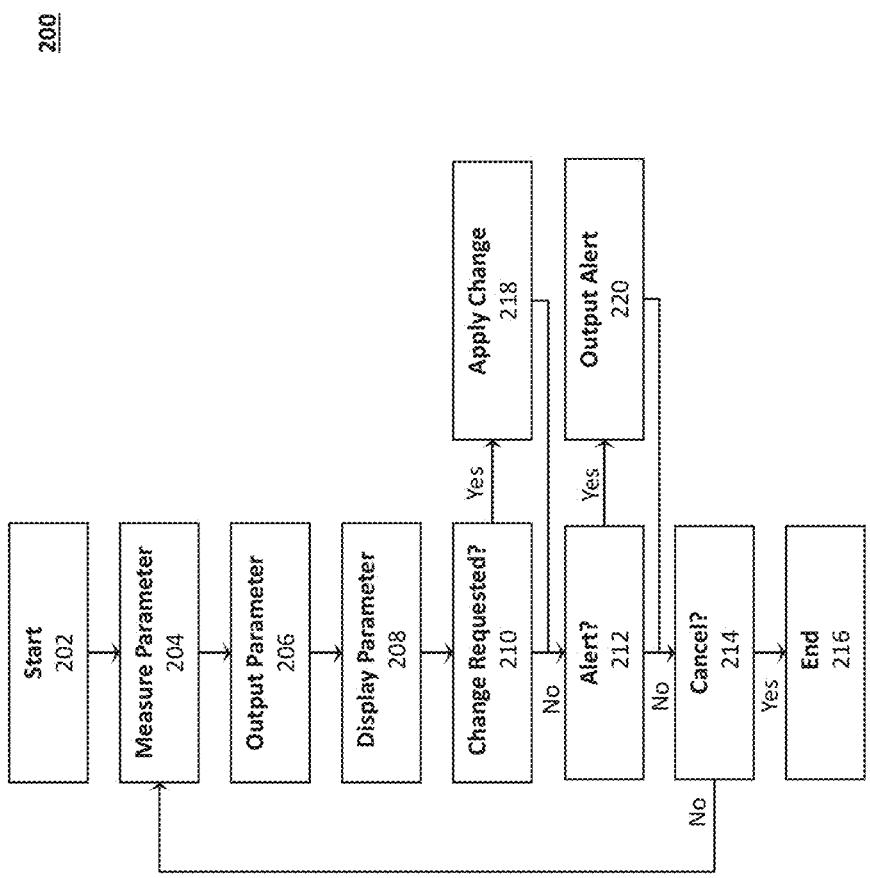
FIG. 2 illustrates a flow diagram depicting an example battery charging system protocol.

Turning to FIG. 2, a flow diagram is depicted of an example battery charging system protocol 200. Starting at step 202, the battery charging system protocol is initiated. At step 204, a measured parameter of the smart battery charger 102 and/or a battery 104 is determined. The smart battery charger 102 receives a series of data (e.g., voltage, current, temperature), whereby the smart battery charger 102 calculates, inter alia, charge percent, battery health, system run time and other measurement parameters. Example measurement parameters include, for example, battery-charging faults (e.g., "No Faults" or a specific fault), battery-charge voltage (volts), battery voltage type, battery-charge current (amps), number of charges starting below a predetermined nominal voltage (e.g., 6V or 12V), percent charge of battery, charge state type, actual charge time (minutes), battery temperature, smart battery temperature, temperature exceeded limit, AC power status, track ampere-minutes put into the battery, battery state of health as a percentage (e.g., 0%-100%, 100% being best), battery type status, type of battery (e.g., AGM, VRLA, lithium ion, etc.), request ACM and gateway radio signal strength, and ACM software version (broadcast on connection only).

As step 206, the parameter is communicated to the interface device 110 and displayed at step 208. At step 210, the user may provide one or more control commands to the smart battery charger 102. For example, the user may include an application control command, reset microcontroller (e.g., processor 128), reset nonvolatile memory after changing battery (e.g., ROM 118 or data storage device 122), host firmware revision, request a dropped message count, download checksum for file used for host user controlled software update, download firmware to external flash via ACM, request device code, product ID, and power mode, report of device code, product ID, and power mode, ACM connection status, and start or stop a given charge.

At step 212, the smart battery charger 102 may alert the user to one or more potential issues. For example, an integrated speaker or display devices may output an alert (e.g., sound, visual, etc.) at step 220 to indicate to the user that there may be an issue with the smart battery charger 102 and/or a battery 104 (e.g., battery 104 has been disconnected, or cannot be charged). Alternatively, the alert may be communicated to the interface device 110 and displayed at step 220. The process may be cancelled at step 214, where, if cancelled, the process ends at step 216. Alternatively, the process may return to step 204 whereby the one or more parameters are updated (e.g., re-measured/calculated) and the cycle continues. The process may be repeated dynamically (e.g., in real time) or in periodic intervals (e.g., every 30 seconds to 5 minutes).

The smart battery charger 102 may be configured with an automatic nominal voltage detection function whereby the smart battery charger 102 may determine the nominal voltage of the battery. For example, the smart battery charger 102 may determine whether a battery is a 12 volt battery or 6 volt battery. When presented with 6 volt and 12 volt batteries, the smart battery charger 102 may determine that the battery is a 12 volt battery (as opposed to a 6 volt battery) if the original voltage upon connection of the battery to the battery charger is greater than a first predetermined voltage (e.g., about 7-10 volts, more preferably about 8 volts); otherwise a decision on the battery type may not be made until one of a plurality of conditions is met. As a first example, if the battery voltage exceeds a second predetermined voltage (e.g., about 9-12 volts, more preferably about 10 volts) within a predetermined period of time (e.g., within 48 hours, more preferably within about 36, most preferably within about 24 hours), the smart battery charger 102 may determine that the battery is a 12 volt battery. As a second example, if the battery voltage decreases by a third predetermined voltage (e.g., 0.1 or more volts); the smart battery charger 102 may determine that the battery is a 6 volt battery.

FIG. 3 illustrates an example auto-detection function algorithm 300 for use with the smart battery charger 102. The process starts at step 302, where the smart battery charger 102 dynamically measures the voltage of the battery 104. If the measured voltage is greater than first predetermined value at step 306, then the smart battery charger 102 flags the battery as a 12 volt battery at step 312. Otherwise, the process proceeds to the next step.

At step 308, the smart battery charger 102 determines whether the measured voltage exceeds a second predetermined value within a first predetermined period of time. If the measured voltage exceeds the second predetermined value within the first predetermined period of time, then the smart battery charger 102 flags the battery 104 as a 12 volt battery at step 312. Otherwise, the process proceeds to the next step.

At step 316, the smart battery charger 102 charges the battery in accordance with a charging protocol for a 12 volt battery.

At step 310, the smart battery charger 102 determines whether the measured voltage has decreased by a predetermined value within a second predetermined period of time. If the measured voltage has decreased by a predetermined value within a second predetermined period of time, then the smart battery charger 102 flags the battery as a 6 volt battery at step 318. Otherwise, the process proceeds to the next step. At step 320, the smart battery charger 102 charges the battery in accordance with a charging protocol for a 6 volt battery. At step 306, the smart battery charger 102 charges the battery in accordance with a default charging protocol, which may be, for example, the protocol for a 6 volt battery.

FIG. 4 illustrates a flow diagram depicting an example battery charging protocol 400. As illustrated, upon startup at step 402, the smart battery charger 102 may cycle through multiple modes, including, for example, diagnostic mode 404, soft start mode 406, bulk mode 408, absorption mode 410, dI/dT mode 412, maintenance mode, before terminating at step 416.

During diagnostic mode 404 the smart battery charger 102 may determine whether one or more parameters of the battery 104 deviate from a predetermined operational range (i.e., range in which the measured value is acceptable) and/or whether the battery 104 is properly connected. For example, if the battery 104 is disconnected, improperly connected, too hot, etc., the smart battery charger 102 may not output a charging current to the battery 104.

During soft start mode 406, the smart battery charger 102 may output a reduced charging current. For example, a soft start mode 406 may be run for a period of time (e.g., 1 to 10 minutes, more preferably about 2 minutes). During the soft start mode 406, the smart battery charger 102 charges the battery 104 using a reduced charging current (e.g., about half the maximum charging current until the battery reached a predetermined charge percentage). The soft start mode 406 may commence if a battery is detected within a predetermined period of time (e.g., 1 to 10 minutes, more preferably about 3 minutes) of auto detect mode, otherwise it starts after the period of time in auto detect mode. The charge percentage of the battery 104 may be calculated upon initiation of the soft start mode 406.

During bulk mode 408, the smart battery charger 102 may output a maximum charging current. A bulk mode 408 may be run for a period of time (e.g., 1 to 10 minutes, more preferably 2 minutes) and commence after soft start mode 406. During the bulk mode 408, the smart battery charger 102 charges the battery 104 using a constant maximum current until the battery 104 rises to an absorption mode 410 level.

During absorption mode 410, the smart battery charger 102 may output a predetermined charging current until the battery achieves a predetermined charge percentage. Absorption mode 410 begins at the start of dI/dT, which is the rate of change of the charge current (I) over time (T). During dI/dT mode 412, for example, the smart battery charger 102 may hold the battery voltage constant and wait for the charge current to level off, or at least stop declining, which is the preferred over setting a current limit (e.g., 0.5 amps) because certain batteries can draw a greater number of amps (e.g., 2 amps or more) even when fully charged. Further, if the smart battery charger 102 detects that the current has increased, the smart battery charger 102 may conclude that the battery 104 is in thermal runaway condition. The dI/dT mode 412 may begin if the measured battery voltage dips below a predetermined voltage after charging for more than a predetermined period of time (e.g., within 48 hours, more preferably within about 36, most preferably within about 24 hours), or the predetermined period of time has elapsed since the last point of progress (voltage increasing), or battery voltage is greater than the maximum voltage. This maximum voltage may be the maximum voltage for the battery type or the current battery voltage if greater than a predetermined voltage (e.g., 14.2 volts for a 12 volt battery) and the current battery voltage is not increased within a preceding period of time (e.g., the prior 5 to 60 minutes, more preferably the prior 30 minutes). This dI/dT mode 412 may also end if the charge current drops below a predetermined current (e.g., 100-500 mA, more preferably about 200-300 mA) and/or the percent charge reaches 100% (or another near capacity value). Two other conditions that may terminate the dI/dT mode 412 include, for example, where the current increases more than a predetermined current (e.g., about 250 mA) in more than 1 minute and where the the current does not decrease within a predetermined period (e.g., about 30 minutes).

Figures 5A, 5B:
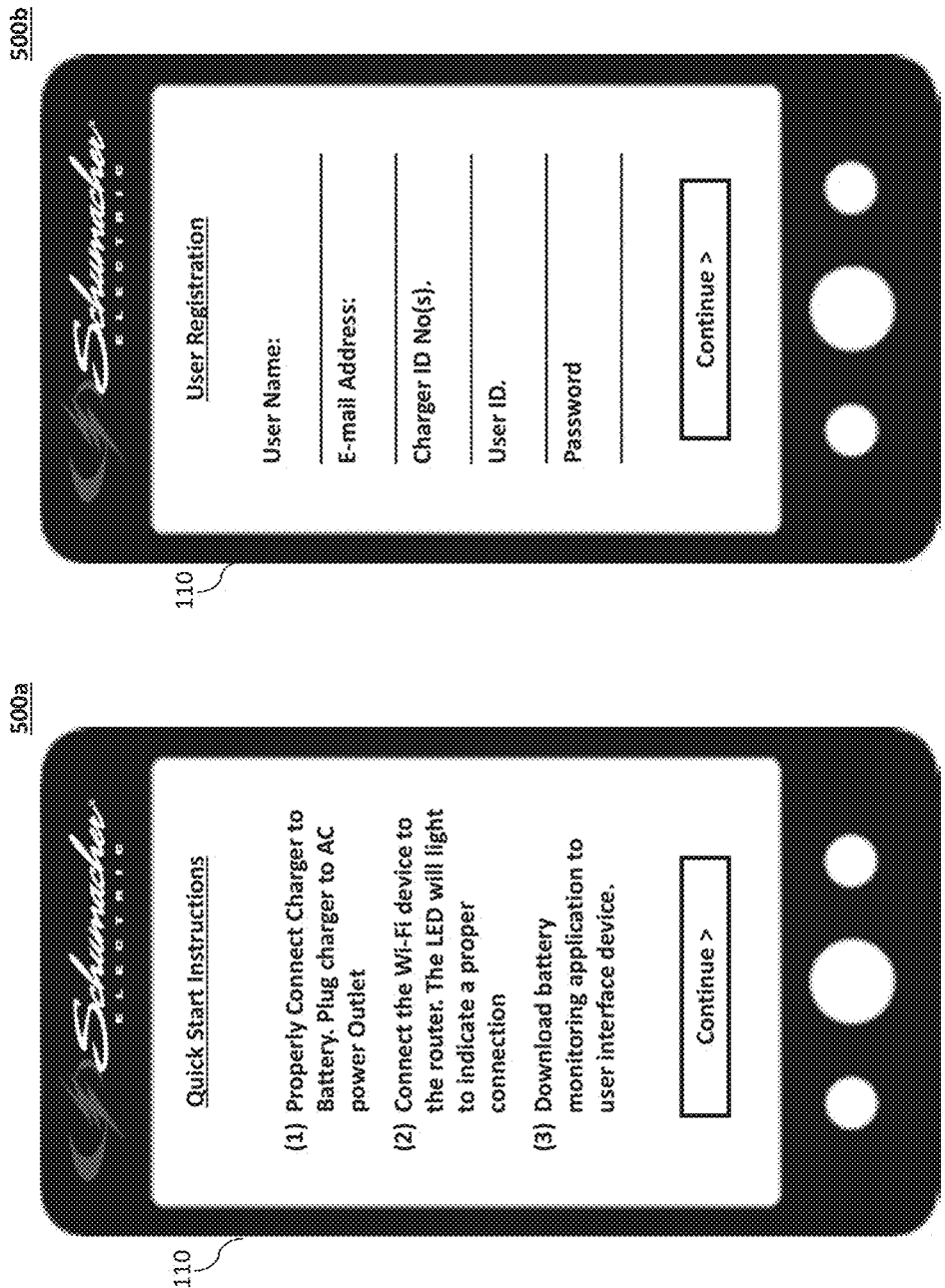
FIG. 5a illustrates an exemplary interface device quick start page.
FIG. 5b illustrates an exemplary interface device user registration page.

Turning now to FIGS. 5a through 5f, various, exemplary interface device 110 user interfaces are illustrated. Specifically, FIG. 5a illustrates a quick start page 500a, which provides instructions to the operator for setting up the smart battery charger 102 and/or linking the interface device 110 to one or more smart battery chargers 102, which may be remotely situated. FIG. 5b illustrates a user registration page 500b whereby a user can enter identifying information about the user and the smart battery charger 102 and battery 104 to be monitored and/or controlled. FIG. 5c illustrates a battery configuration page 500c whereby the user can select the type of battery (e.g., standard lead-acid, AGM, Gel Cell, Deep-Cycle, etc.). The user may also select the type of vehicle coupled to the battery (e.g., car, vintage car, high performance car, motorcycle, boat/watercraft, truck/SUV, snowmobile, RV, lawn-tractors/ATV, etc.). The selections may be selected by, for example, tapping the desired selection or a radial icon. Once the selections have been made, the user can start charging the battery 104 via the smart battery charger 102 by selecting a "start charging" icon 502 via the interface device 110. The smart battery charger 102 will then start charging the battery 104 based upon the battery chemistry and nominal voltage of the battery 104. For example, lead acid batteries may be charged with constant power, constant current, constant voltage, or combination thereof. Such batteries are known to be charged with both linear as well as switched-mode battery chargers. Thus, the user is able to remotely turn on, or off, the smart battery charger 102. To the extent it is not automatically selected, the user may also select a desired charging algorithm. Further, the smart battery charger 102 may be programmed to operate only during specified periods (e.g., for a predetermined time, using a timer, or between two predetermined points in time), so as to address, for example, time-based power conservation needs. The charging may also be configured to charge based on the current temperature (e.g., as measured by the smart battery charger 102) so as to provide temperature sensing-based charging. For example, it may be preferable or efficient to charge when cooler at night.

FIG. 5d illustrates an exemplary home page 500d. The "home" screen may list all smart battery chargers 102 connected to the battery charging system 100 or otherwise associated with the interface device 110, regardless of location, whereby selection of a desired smart battery charger 102 (e.g., one to be controlled/monitored by the user) will present to a more detailed screen (e.g., FIGS. 5e and 5f). The various smart battery chargers 102 may also be named and/or accompanied by icons (e.g., automobile, motorcycle, etc.) to enable the user to quickly identify a desired smart battery charger 102 from a list of smart battery chargers 102.

Figures 5E, 5F:
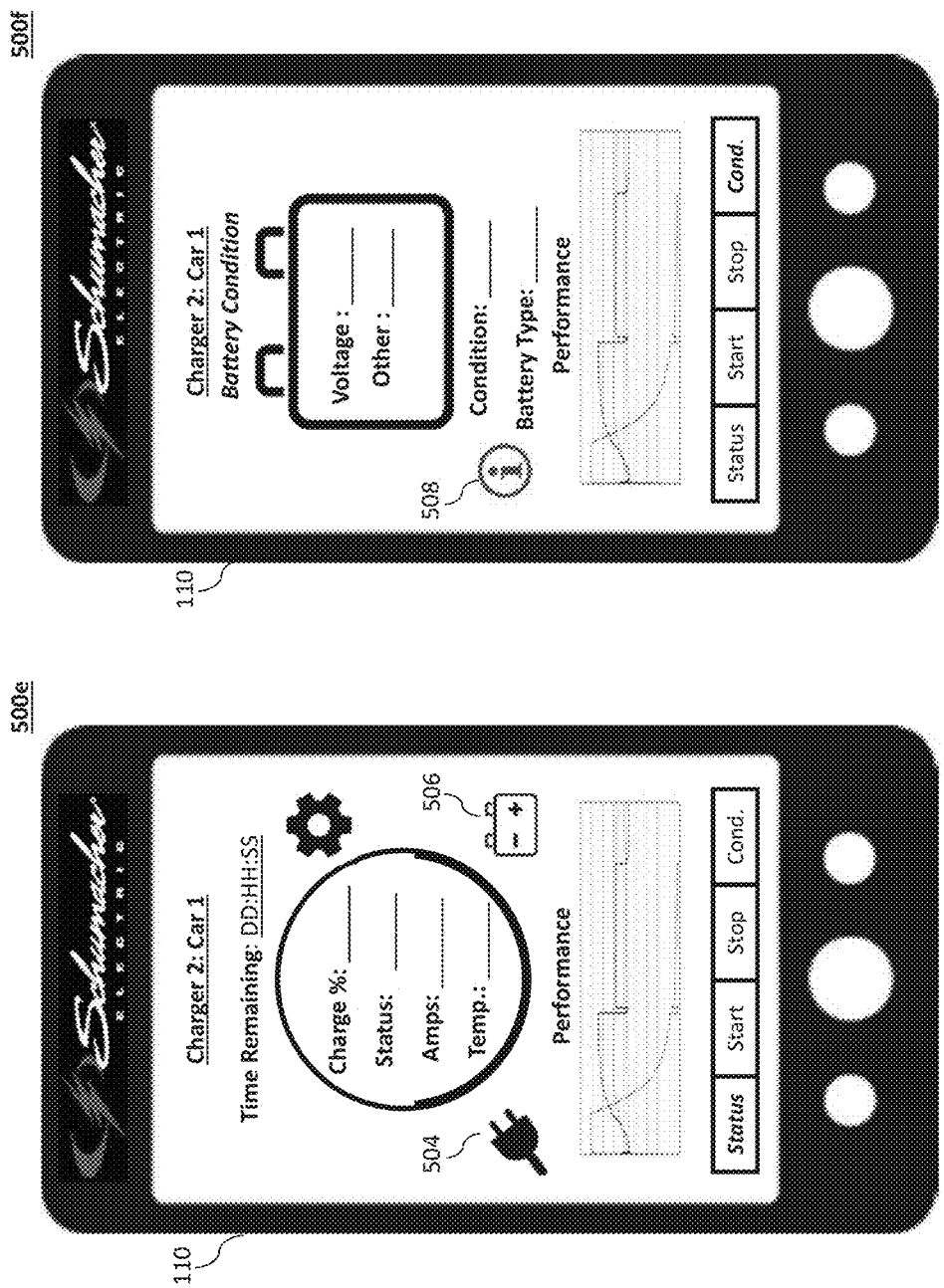
FIG. 5e illustrates an exemplary interface device detailed battery charger page.
FIG. 5f illustrates an exemplary interface device detailed battery page.

FIG. 5e illustrates the various parameters and/or settings for a given battery charger. The parameters may include, inter alia, battery 104/smart battery charger 102 status, power consumption, advance report, instructions, and news/messages. The smart battery charger 102 may be configured to indicate to the user, via the display device 114 or the one or more interface devices 110, one or more maintenance reminders. For example, the smart battery charger 102 may be configured with liquid level and temperature sensing features, or to monitor the weather through the wireless connection (e.g., weather data may be downloaded from the internet or received via a data feed). The reminders, or other information, may be displayed to the user, via the display device 114 or the one or more interface devices 110, as a scrolling message or a graphical user interface.

The interface device 110 may illustrate the connection status for the selected battery charger (e.g., notifications, software upgrades, and wireless/wired connection status). For example, the interface device 110 may display, for the smart battery charger 102 labeled "Charger 2: Car 1" the current charge percentage, the status of the charge (e.g., maintaining, charging, disconnected, etc.), the charging amperes, temperature (e.g., the temperature of the battery 104, smart battery charger 102, etc.), the charging history over a predetermined period of time in the form of the graph or chart.

The underlying data may be saved to the smart battery charger 102, battery management server 108, battery 104 (e.g., a smart battery), and interface device(s) 110 to provide the history over an extended period. The data may be further exported in one or more formatted (e.g., a table, graph, spreadsheet, csv, etc.). The connection status may also be provided, whereby the user can determine that the AC power supply is connected/available (e.g., via AC status icon 504) and that the charger is connected to the battery (e.g., via battery connection status icon 506). As discussed above, the power needed to supply the charger circuitry may be drawn from the battery being charged or an internal auxiliary battery.

FIG. 5f illustrate the battery voltage, battery health (e.g., good, bad, service needed) and the battery type (e.g., 12V AGM). For example, the interface device 110 may illustrate that the 12V AGM battery is currently at 13.2 volts and in good health. The interface device 110 may also provide additional information to the user via information icon 508. For example, if the battery is in poor help, a user may select the information icon 508 and be directed to the manufacturer's page with additional information about the battery 104, or to a retailer that sells suitable replacement external batteries 104.

The interface device 110 may also provide a control interface whereby the user may instruct the smart battery charger 102 to start charging, stop charging, or restart the charging cycle. In certain aspects, the smart battery charger 102 may be provided as an on board charger that monitors battery life and downloads data to the one or more interface devices 110 to give history and alerts for a predetermined period (e.g., month/year) with regard to battery life. In addition, or in lieu of the portable device, a wallboard display may be provided that provides charging status of all connected maintainers (e.g., smart battery charger 102, whether on-board, or separate from the vehicle).

While the forgoing has been described primarily with regard to battery chargers and/or boosters, the various battery 104 monitoring techniques and remote monitoring system may be employed without the battery charging and/or boosting functionality. For example, if a user wishes to merely monitor the status of a vehicle, but does not necessarily wish to charge the vehicle, or is unable to charge the vehicle, the user may couple a battery monitoring system that merely reports the various parameters of the battery 104 or vehicle to the user (e.g., via one or more interface devices 110). Such a battery monitoring system may operate in substantially the same manner as the battery charging system 100, but without requiring charging/boosting functionality and associated components. To avoid draining the battery 104, the battery monitoring system may be similarly equipped with an internal battery 150, which may be recharged by the vehicle when operating (i.e., when the engine is running). Like the battery charging system 100, the battery monitoring system may be integral with the vehicle, or separate, but coupled to the vehicle (e.g., aftermarket).

The above-cited patents and patent publications are hereby incorporated by reference in their entirety. Although various embodiments have been described with reference to a particular arrangement of parts, features, and the like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. A battery charger for supplying current to a vehicle battery of a vehicle, the battery charger comprising:
   a processor;
   a pair of battery cables to detachably connect with the vehicle to charge the vehicle battery;
   a charger circuit to receive an input current from a power supply and to output a predetermined output current to the vehicle battery via the pair of battery cables in accordance with one of a plurality of selectable charging modes,
      wherein said plurality of selectable charging modes includes a first charging mode to provide a battery charging current and a second charging mode to provide an engine start current to the vehicle, and
      wherein the charger circuit is operatively coupled with said processor and is configured to selectively supply the predetermined output current to the vehicle battery via the pair of battery cables;
   a sensor operatively coupled with said processor to monitor a parameter of the vehicle battery via the pair of battery cables to yield a monitored battery parameter, wherein the monitored battery parameter reflects a measured battery current draw on the vehicle battery by the vehicle; and
   a wireless data transceiver operatively coupled with said processor to communicatively couple the battery charger with a portable user device over a communication network;
      wherein the processor is configured to transmit, via the wireless data transceiver, said monitored battery parameter to the portable user device, the portable user device configured to render, based at least in part on the monitored battery parameter, a graphical user interface to display (1) a state of charge or a state of health for the vehicle battery and (2) a status of an accessory of the vehicle that is calculated as a function of a measured current draw on the vehicle battery by the accessory,
      wherein the processor is configured to receive, via the wireless data transceiver, a control command from said portable user device that is configured to instruct the battery charger to: (1) supply the predetermined output current to the vehicle battery via the charger circuit; or (2) discontinue supply of the predetermined output current to the vehicle battery via the charger circuit, and wherein the battery charger employs a predetermined charging mode based at least in part on a user input at said portable user device that indicates a battery type for the vehicle battery.

2. The battery charger of claim 1, wherein the power supply is an AC power source and said charger circuit comprises a high frequency charging circuit.

3. The battery charger of claim 1, wherein the power supply is an AC power source and said charger circuit comprises a linear battery charging circuit.

4. The battery charger of claim 1, wherein the power supply is an AC power source and said charger circuit comprises both a high frequency charging circuit and a linear battery charging circuit.

5. The battery charger of claim 1, wherein the power supply comprises a supercapacitor or an auxiliary battery.

6. The battery charger of claim 1, wherein the battery charger further comprises a user interface and a liquid crystal display (LCD) screen to display status information.

7. The battery charger of claim 1, wherein the battery charger further comprises a display device on a housing of the battery charger to display whether the battery charger is connected to the portable user device over the communication network.

8. The battery charger of claim 1, wherein the accessory is a vehicle light.

9. The battery charger of claim 1, wherein the accessory is an entertainment system.

10. The battery charger of claim 1, wherein the battery charger is configured to draw an operating current from the vehicle battery to power the wireless data transceiver and the processor if the input current from the power supply is unavailable or depleted.

11. The battery charger of claim 10, wherein the processor is configured to transmit, via the wireless data transceiver, an alert to the portable user device indicating whether the input current from the power supply is unavailable or depleted.

12. The battery charger of claim 1, wherein the processor is configured to use said monitored battery parameter to identify a low battery voltage condition when a voltage of the vehicle battery has dropped below a predetermined voltage.

13. The battery charger of claim 1, wherein the battery charger further comprises a user interface and a display device, wherein the display device is configured to display an icon indicative of whether the battery charger is connected to the portable user device over the communication network.

14. The battery charger of claim 1, wherein the processor is configured to receive, via the communication network, a software update or a firmware update for the battery charger.

15. The battery charger of claim 1, wherein the status of the accessory is determined by correlating the measured current draw with one of a plurality of predetermined battery current draw values via a data look up table.

16. The battery charger of claim 1, wherein said user input indicates a nominal voltage of the vehicle battery.

17. The battery charger of claim 1, wherein the wireless data transceiver is configured to operate in accordance with the IEEE 802.11 standards and is operable to communicate with the portable user device over a local network.

18. The battery charger of claim 1, wherein the graphical user interface is configured to display a charging history for the vehicle battery over a predetermined period.

19. The battery charger of claim 18, wherein the graphical user interface includes a hyperlink that, when selected, displays a website with additional information about the vehicle battery or replacements thereof.

20. A battery charging system comprising:
a battery charger configured to supply current to a vehicle battery of a vehicle, the battery charger comprising:
a processor;
a pair of battery cables to detachably connect with the vehicle to charge the vehicle battery;
a charger circuit to receive an input current from a power supply and to output a predetermined output current to the vehicle battery via the pair of battery cables in accordance with one of a plurality of selectable charging modes, a sensor operatively coupled with said processor to monitor a parameter of the vehicle battery via the pair of battery cables to yield a monitored battery parameter, and a wireless data transceiver operatively coupled with said processor to communicatively couple the battery charger with a communication network,
wherein said plurality of selectable charging modes includes a first charging mode to provide a battery charging current and a second charging mode to provide an engine start current to the vehicle,
wherein the battery charger is configured to draw an operating current from the vehicle battery to power the wireless data transceiver and the processor if the input current from the power supply is unavailable,
wherein the charger circuit is operatively coupled with said processor and is configured to selectively supply the predetermined output current to the vehicle battery via the pair of battery cables, and
wherein the battery charger employs a predetermined charging mode based at least in part on a user input that indicates a battery type for the vehicle battery; and
a remote server communicatively coupled with the battery charger over the communication network via said wireless data transceiver, wherein the remote server is configured to (1) receive, from said battery charger one or more parameters of the battery charger or the vehicle battery; (2) communicate said one or more parameters of the battery charger or the vehicle battery to a remotely situated, portable user device; (3) receive, from said remotely situated, portable user device, one or more control commands; and (4) communicate said one or more control commands to the battery charger that are configured to instruct the battery charger to: (a) supply the predetermined output current to the vehicle battery via the charger circuit; or (b) discontinue supply of the predetermined output current to the vehicle battery via the charger circuit.

21. The battery charging system of claim 20, wherein at least one of said one or more control command instructs the battery charger to perform at least one of: (1) charge the vehicle battery; (2) stop charging the vehicle battery; and (3) reset the battery charger.

22. The battery charging system of claim 20, wherein said battery charger employs a predetermined charging mode based at least in part on a user input at said remotely situated, portable user device.

23. The battery charging system of claim 22, wherein said user input indicates a battery type or a nominal voltage of the vehicle battery.

24. The battery charging system of claim 20, wherein the processor is configured to use said monitored battery parameter to identify a battery current draw on the vehicle battery by a vehicle and correlate the battery current draw with a condition of the vehicle via a data look up table.

25. The battery charging system of claim 24, wherein the condition of the vehicle is whether a component of the vehicle is on.

26. The battery charging system of claim 25, wherein the component includes a vehicle light.

27. The battery charging system of claim 25, wherein the component is an entertainment system.

\* \* \* \* \*